(12) United States Patent
Khan et al.

(10) Patent No.: US 12,281,044 B1
(45) Date of Patent: Apr. 22, 2025

(54) CONCRETE COMPOSITION INCLUDING NANOSILICA DERIVED FROM GLASS WASTE

(71) Applicant: KING SAUD UNIVERSITY, Riyadh (SA)

(72) Inventors: Mohammad Iqbal Khan, Riyadh (SA); Galal Mohamed Fares, Riyadh (SA); Yassir Mohammed Abbas, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/919,815

(22) Filed: Oct. 18, 2024

(51) Int. Cl.
| | | |
|---|---|---|
| C04B 28/02 | (2006.01) |
| C04B 14/06 | (2006.01) |
| C04B 14/22 | (2006.01) |
| C04B 14/48 | (2006.01) |
| C04B 18/08 | (2006.01) |
| C04B 18/14 | (2006.01) |
| C04B 24/26 | (2006.01) |
| C04B 40/00 | (2006.01) |
| C04B 103/32 | (2006.01) |

(52) U.S. Cl.
CPC ............ C04B 28/02 (2013.01); C04B 14/062 (2013.01); C04B 14/22 (2013.01); C04B 14/48 (2013.01); C04B 18/082 (2013.01); C04B 18/146 (2013.01); C04B 24/2647 (2013.01); C04B 40/0046 (2013.01); C04B 2103/32 (2013.01); C04B 2201/52 (2013.01)

(58) Field of Classification Search
CPC ....... C04B 28/02; C04B 14/062; C04B 14/22; C04B 14/48; C04B 18/082; C04B 18/146; C04B 24/2647; C04B 40/0046; C04B 2103/32; C04B 2201/52
See application file for complete search history.

(56) References Cited

FOREIGN PATENT DOCUMENTS

| | | | | |
|---|---|---|---|---|
| CN | 112960956 A | * | 6/2021 | |
| CN | 114940604 A | * | 8/2022 | ............ C04B 14/062 |
| CN | 116854431 A | * | 10/2023 | ............. C04B 28/04 |
| DE | 102013114824 A1 | | 7/2014 | |

OTHER PUBLICATIONS

Mosaberpanah, et al; "The effect of nano-silica and waste glass powder on mechanical, rheological, and shrinkage properties of UHPC using response surface methodology"; Journal of Materials Research and Technology vol. 8, Issue 1, Jan.-Mar. 2019, pp. 804-811.

Taiyab, et al; IRJET—"Experimental Study on UHPC Using Nano Silica, Waste Glass Powder and Steel Fibers"; International Research Journal of Engineering and Technology (IRJET) e-ISSN: 2395-0056 vol. 08 Issue: 09 | Sep. 2021 www.irjet.net p-ISSN: 2395-0072.

Samadi, et al; "Influence of Glass Silica Waste Nano Powder on the Mechanical and Microstructure Properties of Alkali-Activated Mortars"; Nanomaterials (Basel). Feb. 2020; 10(2): 324. Published online Feb. 14, 2020. doi: 10.3390/nano10020324.

Mostafa, et al; "Evaluation of the nano silica and nano waste materials on the corrosion protection of high strength steel embedded in ultra-high performance concrete"; Scientific Reports | (2021) 11:2617 | https://doi.org/10.1038/s41598-021-82322-0.

Faried, et al, "Mechanical and durability properties of ultra-high performance concrete incorporated with various nano waste materials under different curing conditions"; Journal of Building Engineering vol. 43, Nov. 2021, 102569.

Lu, et al, "Improvement of early-age properties for glass-cement mortar by adding nanosilica"; Cement and Concrete Composites vol. 89, May 2018, pp. 18-30.

Why Glass Powder is preferred in Concrete? "Why Ground Glass? (What is Glass Powder)"; Glass Chip (online), Jan. 31, 2022.

Sikora, et al; "Thermal properties of cement mortars containing waste glass aggregate and nanosilica"; Creative Construction Conference 2017, CCC 2017, Jun. 19-22, 2017, Primosten, Croatia; Available online at www.sciencedirect.com 1877-7058 © 2017 The Authors. Published by Elsevier Ltd. doi: 10.1016/j.proeng.2017.07.186.

"NS Nano silica in concrete ppt"; website for HSA Microsilica blog Added for informational purposes on Mar. 7, 2024.

* cited by examiner

Primary Examiner — Anthony J Green
(74) Attorney, Agent, or Firm — Nath, Goldberg & Meyer; Joshua B. Goldberg

(57) ABSTRACT

A method of making high performance concrete, the method may include adding ground glass powder (GP), nanosilica (nS) powder, cement, silica fume, fly ash, and sand to create a homogenized mixture. The method may also include homogenizing the mixture by mixing and adding water and superplasticizer to the homogenized mixture to obtain a slurry. The method may also include mixing the slurry until a high flowability mixture is obtained. The method may then include adding a first microsteel fiber (T1) to the high flowability mixture; adding a second microsteel fiber (T3) to the high flowability mixture; adding a third microsteel fiber (T4) to the high flowability mixture; and casting the high flowability mixture.

21 Claims, 2 Drawing Sheets

CONCRETE COMPOSITION INCLUDING NANOSILICA DERIVED FROM GLASS WASTE

BACKGROUND

1. Field

The disclosure of the present patent application relates to a concrete composition including glass waste and, particularly, to a concrete composition including nanosilica derived from glass waste.

2. Description of the Related Art

The intrinsic properties of several waste materials make them valuable resources for advanced materials for various high-income applications. Waste glass, despite its hazardous properties, has a high potential for reuse.

Thus, a method for repurposing glass waste and using it in construction materials is desired.

SUMMARY

In the present disclosure, the application of nanosilica derived from waste glass in preparation of an ultra-high-performance cementitious matrix is described. The use of nanoparticles produced in U.S. patent application Ser. No. 18/615,277, entitled Effective Method for Producing Glass Waste Powder As A Precursor For The Production Of Nanosilica, filed Mar. 25, 2024, and U.S. application Ser. No. 18/777,964, entitled Method for Making Nanosilica from Glass Waste, filed Jul. 19, 2024, each of which are incorporated entirely by reference, allows concrete to be advanced from high to ultrahigh strength classes under the same composition and curing conditions.

The present disclosure relates to a concrete composition including about 24% to about 44% cement (C); about 9.4% silica fume (SF); about 2.6% fly ash (FA); about 25% sand; about 8.4% water; about 1.6% superplasticizer; and about 7.9% microsteel fibers, wherein 0% to about 20% or at least about 1% to about 20% of the cement is replaced with ground glass powder (GP); and wherein at least about 0.1% to about 1% of the cement is replaced with nanosilica (nS) powder. For example, in an embodiment, the concrete composition includes about 24% to about 44% cement (C); about 9.4% silica fume (SF); about 2.6% fly ash (FA); about 25% sand; about 8.4% water; about 1.6% superplasticizer; about 7.9% microsteel fibers; about 0% to about 20% ground glass powder (GP); and at least about 0.1% to about 1% nanosilica (nS) powder.

In an embodiment, the present disclosure relates to a method of making a concrete composition, the method may include combining ground glass powder (GP), nanosilica (nS) powder, cement, silica fume, fly ash, and sand to create a mixture. The method may also include homogenizing the mixture by mixing for a period of time enough for apparent homogenization, e.g., about four minutes, to obtain a homogenized mixture and adding water and superplasticizer to the homogenized mixture to obtain a slurry. The method may also include mixing the slurry, e.g., for at least about 15 minutes to at least about 30 minutes, until a high flowability mixture is obtained. The method may then include adding a first microsteel fiber (T1); adding a second microsteel fiber (T3); and adding a third microsteel fiber (T4) to the mixture and casting mixture to provide the concrete composition.

These and other features of the present subject matter will become readily apparent upon further review of the following specification.

DETAILED DESCRIPTION OF THE PREFERRED EMBODIMENTS

Figure 1:
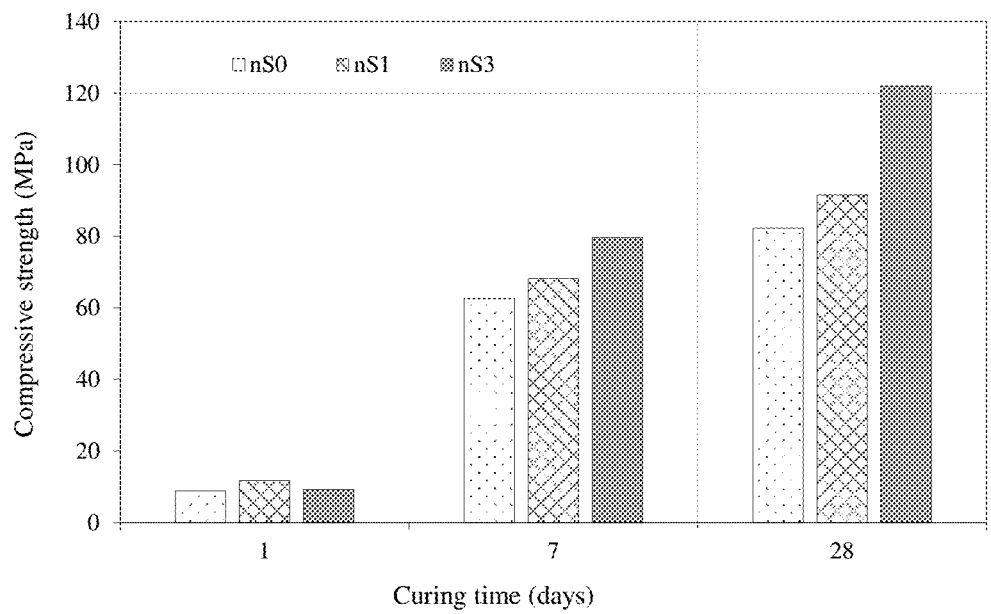
FIG. 1 shows a graph illustrating the development of strength in the presence of nanosilica of embodiments for obtaining an ultra-high-performance concrete as described herein.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component may be any one of the recited elements or components, or the element or component may be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

According to an embodiment, the present subject matter relates to the application of recovered nanosilica from waste glass in a concrete composition. The silica nanoparticles (nanosilica) can be produced as set forth in U.S. patent application Ser. No. 18/615,277, entitled Effective Method for Producing Glass Waste Powder As A Precursor For The Production Of Nanosilica, filed Mar. 25, 2024, and U.S. application Ser. No. 18/777,964, entitled Method for Making Nanosilica from Glass Waste, filed Jul. 19, 2024, each of which are incorporated entirely by reference.

The present disclosure relates to a concrete composition including: about 24% to about 44% cement (C); about 9.4% silica fume (SF); about 2.6% fly ash (FA); about 25% sand; about 8.4% water; about 1.6% superplasticizer; about 7.9% microsteel fibers; wherein 0% to about 20% or at least about 1% to about 20% of cement is replaced with ground glass powder (GP); and wherein at least 0.1% to 1% of the cement is replaced with nanosilica (nS) powder. The nanosilica is not silica fume. In various embodiments, including 0.3% nanosilica (nS) powder in the composition may achieve an ultra-high strength concrete composition. In various embodiments, the nanosilica (nS) powder may be obtained from glass powder.

In an embodiment, the present disclosure relates to a concrete composition including: about 24% to about 44% cement (C); about 9.4% silica fume (SF); about 2.6% fly ash (FA); about 25% sand; about 8.4% water; about 1.6% superplasticizer; about 7.9% microsteel fibers, and about 0% to about 20% ground glass powder (GP). In an embodiment, the concrete composition includes at least about 0.1% to about 1% nanosilica (nS) powder.

In certain embodiments, the FA may include Cenospheric Fly Ash.

In some embodiments, the sand may be selected from the group consisting of empty quarter sand (EQS) and red sand (RD).

In various embodiments, the water and the cement may be added in a ratio of about 0.16 to about 0.55. In an embodiment, the cement may be a binder. In other embodiments, other binders may be used in addition to or in place of the cement binder. In some embodiments, the water and a binder may be added in a ratio of about 0.16 to about 0.55. In another embodiment, a ratio of water to binder may be 0.35. In still other embodiments, a ratio of water to cement may be 0.35.

In certain embodiments, the superplasticizer may be polycarboxylate ether-based comb-structured superplasticizer.

In some embodiments, the ultrahigh performance concrete includes less than about 5% glass powder (GP).

In an embodiment, the ultrahigh performance concrete may include about 0.3% nanosilica (nS) powder.

In another embodiment, the nanosilica (nS) powder may be made from the glass powder.

In various embodiments, the nanosilica powder may include nanoparticles having a density of about 2.48 g/cm$^3$.

In certain embodiments, the nanoparticles may have a shape comprising a sphere.

In some embodiments, the nanoparticles have a size less than 50 nm.

In an embodiment, the microsteel fibers may include varying sizes. For example, T1 may include an average aspect ratio of 66 μm and an average diameter of 196 μm; T3 may include an average aspect ratio of 56 and an average diameter of 320 μm; and T4 may include an average aspect ratio of 92 and an average diameter of 330 μm.

In various embodiments, the high-performance concrete as described herein may have a compressive strength of more than 120 MPa when the concrete comprises 0.3% nS powder.

In other embodiments, the high-performance concrete as described herein may have a compressive strength of more than 80 MPa when the concrete comprises 0.1% nS.

The present subject matter may also relate to a method of making ultra-high performance concrete. The method may include combining the ground glass powder (GP), the nanosilica (nS) powder, the cement, the silica fume, the fly ash, and the sand to create a mixture. The method may include homogenizing the mixture by mixing for 4 minutes to obtain a homogenized mixture. The method may further include adding the water and the superplasticizer to the homogenized mixture to obtain a slurry and mixing the slurry for at least about 15 minutes to at least about 30 minutes until a high flowability mixture is obtained. The method may also include adding a first microsteel fiber (T1) to the high flowability mixture; adding a second microsteel fiber (T3) to the high flowability mixture; and adding a third microsteel fiber (T4) to the high flowability mixture. The method may also include casting the high flowability mixture to obtain the ultra-high performance concrete.

In some embodiments, adding the T1 may last for at least about 1 minute, about 1 minute, or for 1 minute.

In certain embodiments, adding the T3 may last for at least about 1 minute, about 1 minute, or for 1 minute.

In various embodiments, adding the T4 may last for at least about 30 seconds, about 30 seconds, or for 30 seconds.

In certain embodiments, the method may also include measuring flowability after adding T4 and before casting the mixture.

In other embodiments, the concrete may have a compressive strength of at least about 90 MPa after curing for at least about 28 days, about 28 days, or 28 days.

In various embodiments, the ground glass powder (GP), may be obtained according to the method described in U.S. patent application Ser. No. 18/615,277. The GP may be used in the range of 0 to 20% in the preparation of the concrete compositions described herein, e.g., high-performance or ultrahigh-performance concrete compositions (UHPCC).

The collected nanosilica (nS) powder, as described in U.S. patent application Ser. No. 18/777,964 as previously incorporated herein, can be used in the preparation of advanced cementitious composites, e.g., the concrete compositions described herein, in the range of about 0.1% to about 1%.

In various embodiments of the cementitious system as described herein, the system may include a water-to-binder ratio of 0.35. A dosage of 0.3% was identified as the optimal dosage of nanosilica. In other embodiments, other conditions and a wider range of water-to-binder ratio of 0.16-0.55 can be used.

In certain embodiments, the compressive strength of the mixture without nanosilica may be changed from high strength to ultrahigh strength by incorporating 0.3% nanosilica.

In other embodiments, the concrete system as described herein may be used in high-performance and ultrahigh-performance concrete composites (HPCC and UHPCC) in the presence of microsteel fibers and other conventional cementitious materials. In an embodiment, a high performance concrete may have a compressive strength ranging from about 80 MPa to less than about 120 MPa. In an embodiment, an ultra-high performance concrete may have a compressive strength of more than about 120 MPa.

The following examples relate to various methods of manufacturing the specific embodiments and application of the same, as described herein.

EXAMPLES

Example 1

Method of Making Concrete Composition

The mix components used in preparing the concrete composition are shown in Table 2, where C stands for cement, SF stands for silica fume, FA stands for Fly Ash, W stands for water, SP stands for silica powder, T1 stands for microsteel fibers having an average aspect ratio of 66 and an average diameter of 196 μm, T3 stands for microsteel fibers having an average aspect ratio of 56 and an average diameter of 320 μm; and T4 stands for microsteel fibers having an average aspect ratio of 92 and an average diameter of 330 μm. The mixing procedure started with the solid materials in the composition being homogenized for four minutes in a 95-liter concrete mixer at 40 to 50 rpm. Next, a homogenized mixture of water and superplasticizer was gradually added, and the mixing was continued for 15 to 30 minutes until a mix with high flowability was achieved. Then, the process included gradual addition of T1 for 1 minute, followed by T3 for 1 minute, and T4 for 30 seconds to stop, measure flowability, and cast. All the solid materials, regardless of sizes, were homogenized together first.

After obtaining a high content nanosilica portion and drying, the nanosilica was collected for preparation of the ultra high performance cement (UHPC). The properties were tested in cement pastes. As listed in Table 1, two dosages of nano-silica (nS), 0.1% and 0.3%, identified as S1 and S3 compared to the control mix of 0% nanoparticles were prepared and presented in FIG. 1. At 28 days of normal curing, the presence of 0.3% nano-silica in S3 shifted the paste strength from high to ultra-high.

TABLE 1

| Composition of paste mixes (W/B = 0.35) | | |
|---|---|---|
| | Cement | GP |
| S0 | 100 | 0 |
| S1 | 99.9 | 0.1 |
| S3 | 99.7 | 0.3 |

Fine powders and fine aggregates were the most essential ingredients in the preparation of UHPC. The mix composition optimized and used in this concrete is shown in Table 2, where C stands for cement, SF stands for silica fume, FA stands for Fly Ash, W stands for water, SP stands for silica powder, T1 stands for microsteel fibers having an average aspect ratio of 66 and an average diameter of 196 μm, T3 stands for microsteel fibers having an average aspect ratio of 56 and an average diameter of 320 μm; and T4 stands for microsteel fibers having an average aspect ratio of 92 and an average diameter of 330 μm. The content of 0, 5, 10 and 20% GP were used as partial replacement levels of cement as presented in Table 3.

TABLE 2

| Mix composition of the UHPC | | | | | | | | |
|---|---|---|---|---|---|---|---|---|
| C | SF | FA | S | W | SP | T1 | T3 | T4 |
| 1107 | 236 | 65 | 633 | 210 | 39 | 149 | 42 | 7 |

TABLE 3

| Mix Identifications | |
|---|---|
| | GP (%) |
| GPo | 0 |
| GP5 | 5 |
| GP10 | 10 |
| GP20 | 20 |

Figure 2:
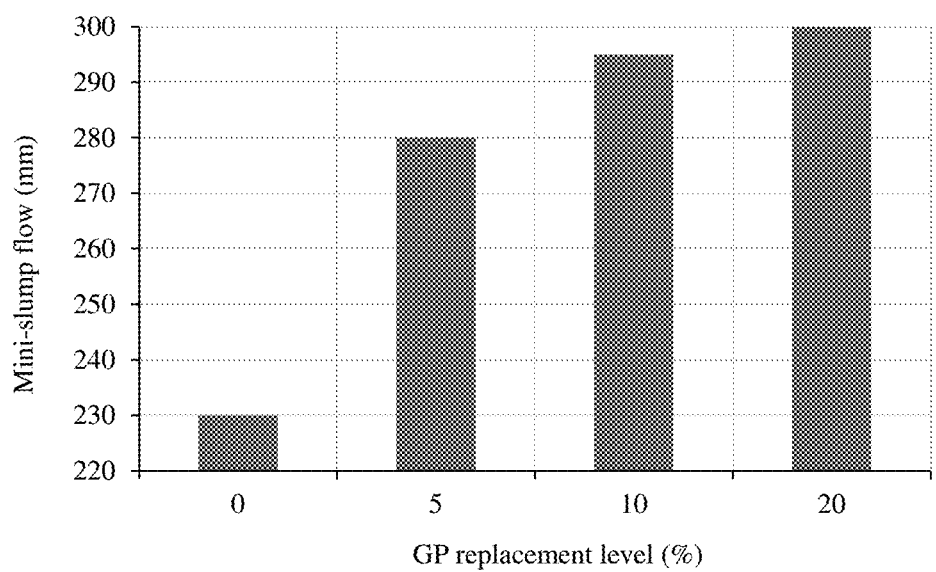
FIG. 2 shows a graph illustrating the effect of glass powder replacement on mini-slump flow rates of embodiments of ultra-high-performance concrete as described herein.

The effect of GP replacement level on mini-slump flow values of the mixes was monitored, as presented in FIG. 2. It is evident that under these mix conditions, the incorporation of GP enhances the flowability of the mix, due to the glassy nature of GP particles, which causes a slippery action among particles with improved flowability.

Figure 3:
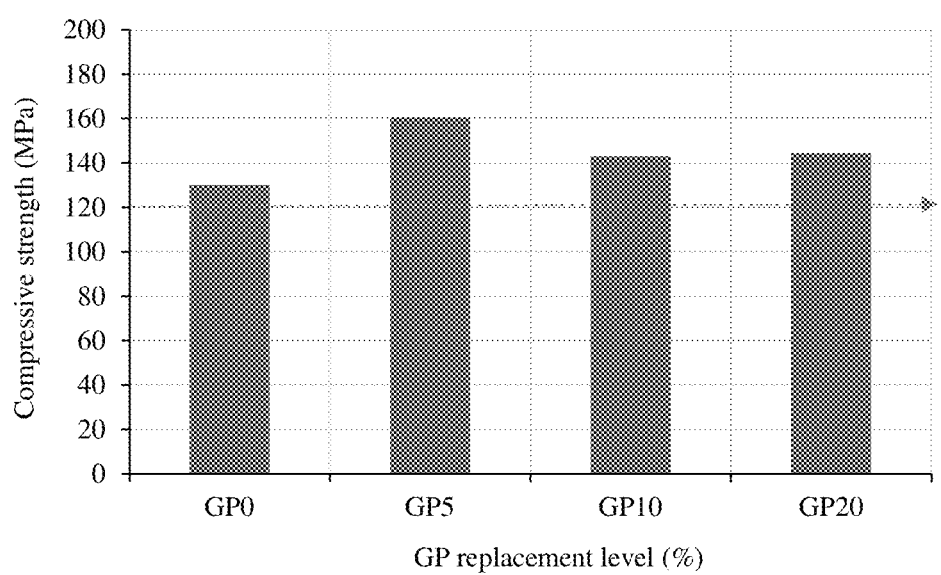
FIG. 3 shows a graph illustrating the effect of glass powder replacement on compressive strength of embodiments of ultra-high-performance concrete as described herein.

The effect of GP replacement level on the compressive strength is shown in FIG. 3. It obvious that the optimum replacement level under these mix conditions is at 5% GP.

It is to be understood that embodiments of the concrete compositions as described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A concrete composition, comprising:
   about 24% to about 44% cement (C);
   about 9.4% silica fume (SF);
   about 2.6% fly ash (FA);
   about 25% sand;
   about 8.4% water;
   about 1.6% superplasticizer;
   about 7.9% microsteel fibers;
   wherein at least 0% to 20% of cement is replaced with ground glass powder (GP); and
   wherein at least 0.1% to 1% of the cement is replaced with nanosilica (nS) powder.

2. The concrete composition of claim 1, wherein the fly ash comprises Cenospheric Fly Ash.

3. The concrete composition of claim 1, wherein the sand is selected from the group consisting of empty quarter sand (EQS) and red sand (RD).

4. The concrete composition of claim 1, wherein the water and the cement are present in a ratio of about 0.16 to about 0.55.

5. The concrete composition of claim 4, wherein the ratio of the water to the cement is 0.35.

6. The concrete composition of claim 1, wherein the superplasticizer is polycarboxylic ether-based comb-structured superplasticizer.

7. The concrete composition of claim 1, wherein the concrete composition comprises about 1% to about 5% glass powder (GP).

8. The concrete composition of claim 1, wherein the ultrahigh performance concrete comprises about 0.3% nanosilica (nS) powder.

9. The concrete composition of claim 1, wherein the nanosilica (nS) powder is made from glass powder.

10. The concrete composition of claim 1, wherein the nanosilica (nS) powder comprises nanoparticles having a density of about 2.48 g/cm$^3$.

11. The concrete composition of claim 10, wherein the nanoparticles have a shape comprising a sphere.

12. The concrete composition of claim 10, wherein the nanoparticles have a size less than 50 nm.

13. The concrete composition of claim 10, wherein the microsteel fibers include one or more fibers selected from the group consisting of fibers comprising an average aspect ratio of 66 μm and an average diameter of 196 μm (T1); fibers comprising an average aspect ratio of 56 and an average diameter of 320 μm (T2); and fibers comprising an average aspect ratio of 92 and an average diameter of 330 μm (T3).

14. The concrete composition of claim 10, wherein the concrete composition comprises about 0.3% nanosilica powder and has a compressive strength of more than about 120 MPa.

15. The concrete of claim 1, wherein the concrete composition comprises about 0.1% glass powder (GP) and has a compressive strength of more than about 80 MPa and less than about 120 MPa.

16. A method of making the concrete composition of claim 1, the method comprising:
   combining the ground glass powder (GP), the nanosilica (nS) powder, the cement, the silica fume, the fly ash, and the sand to create a mixture,
   homogenizing the mixture by mixing to obtain a homogenized mixture;
   adding the water and the superplasticizer to the homogenized mixture to obtain a slurry;
   mixing the slurry until a high flowability mixture is obtained;
   adding a first microsteel fiber (T1) to the high flowability mixture;
   adding a second microsteel fiber (T3) to the high flowability mixture;
   adding a third microsteel fiber (T4) to the high flowability mixture; and
   casting the high flowability mixture.

17. The method of claim 15, wherein adding the T1 lasts for at least about 1 minute.

18. The method of claim 15, wherein adding the T3 lasts for at least about 1 minute.

19. The method of claim 15, wherein adding the T4 lasts for at least about 30 seconds.

20. The method of claim 15, further comprising measuring flowability after adding T4 and before casting the mixture.

21. The method of claim 15, wherein the concrete has a compressive strength of at least about 90 MPa after curing for at least about 28 days.

* * * * *